United States Patent
Ebert

(10) Patent No.: US 7,325,380 B2
(45) Date of Patent: Feb. 5, 2008

(54) SYSTEM COMPRISING A CLIP MACHINE AND A CLIP SUPPLY AND METHOD OF OPERATING SUCH A CLIP MACHINE

(75) Inventor: Detlef Ebert, Bad Nauheim (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 11/419,877

(22) Filed: May 23, 2006

(65) Prior Publication Data

US 2007/0011990 A1    Jan. 18, 2007

(30) Foreign Application Priority Data

Jul. 18, 2005    (DE) ...................... 10 2005 033 437

(51) Int. Cl.
    *B65B 51/04*    (2006.01)
(52) U.S. Cl. ........................................ 53/417; 53/138.4
(58) Field of Classification Search .................. 53/417, 53/138.1, 138.2, 138.3, 138.4; 452/48; 227/2
    See application file for complete search history.

(56) References Cited

U.S. PATENT DOCUMENTS 6,101,785 A * 8/2000 Bienert et al. ............. 53/138.4
6,182,734 B1 * 2/2001 Ebert et al. ................. 156/581
6,217,436 B1 * 4/2001 Hanten et al. ................ 452/48
6,298,635 B1 * 10/2001 Bienert et al. ............. 53/138.4
6,739,490 B1 * 5/2004 Shkolnikov et al. ........... 227/2
6,871,474 B2 * 3/2005 Topfer ....................... 53/138.4

FOREIGN PATENT DOCUMENTS

| DE | 197 45 163 A1 | 3/1999 |
| DE | 197 38 298 C1 | 4/1999 |
| DE | 199 41 485 A1 | 10/2000 |
| EP | 1 266 830 A1 | 12/2002 |

* cited by examiner

*Primary Examiner*—Louis Huynh
(74) *Attorney, Agent, or Firm*—Hahn Loeser & Parks LLP; Michael H. Minns

(57) ABSTRACT

A system comprising a clip machine having at least one interchangeable first closure tool movable relative to a second closure tool for closing clips around a packaging case of tubular or bag shape, and a clip supply; the first closure tool and the clip supply each having a respective identification; the clip machine having a first sensor device adapted to identify the identification of the clip supply and output a corresponding clip information signal, a second sensor device adapted to identify the identification of the first closure tool and output a corresponding closure tool information signal, and a control having a signal input coupled to the first and the second sensor devices and an evaluation unit adapted to evaluate the clip information signal and the closure tool information signal and to output a compatibility signal.

38 Claims, 3 Drawing Sheets

SYSTEM COMPRISING A CLIP MACHINE AND A CLIP SUPPLY AND METHOD OF OPERATING SUCH A CLIP MACHINE

This patent application claims priority to German patent application DE 10 2005 033 437.7-27, filed Jul. 18, 2005, hereby incorporated by reference.

TECHNICAL FIELD

The invention concerns a system comprising a clip machine and a clip supply as well as a method of operating such a clip machine. The clip machine has at least one interchangeable first closure tool which is movable relative to a second closure tool for closing clips fed from the clip supply around a packaging case of tubular or bag shape.

BACKGROUND OF THE INVENTION

Clip machines of the specified kind are used typically for closing packaging cases in bag or tubular shape which are filled with liquid to firm pasty or even (partly) granular content. In that procedure firstly the filling material is introduced into the packaging case and—in the case of a tubular packaging case—thereafter divided up into portions (sausages) by means of displacement elements. For that purpose the displacement elements constrict the packaging case in the radial direction and displace the filling material in the constriction region in the axial direction—with respect to the tube axis. A tubular plaited end portion is thus formed in the constriction region. In the next working cycle one or in the case of a dual clip arrangement two closure elements are applied to the tubular plaited end portion formed in that way, in mutually juxtaposed relationship, by means of the mutually movable closure tools described in the opening part of this specification.

The closure tools respectively include in paired relationship a male die and a female die, between which the clip is shaped around the packaging case during the closure operation until the minimum spacing of the closure tools is reached (closure spacing). After the closure operation the closure tools are moved back into their starting or open position.

High demands are made in terms of the quality of such a closure. On the other hand it is not to be so firm that the packaging case is damaged in the closure operation. On the other hand however the closure must be of sufficient sealing integrity so that for example in subsequent treatment of the closed sausage (cooking, smoking etc) it does not slip off the packaging case. If the clip machine is to be used for a large number of different sausage products and packaging cases, different clips are therefore used, which differ both in respect of their strength and also their size (limb length and material thickness). In general terms therefore in most cases at least one of the closure tools is also interchangeable and closure tools which are suitably matched to the respective size of the clip being used are employed in order to achieve precisely defined deformation of the clip in the closure operation.

The interchangeable closure tool is generally the female die which can be fitted into a (accurately fitting) female die holder and fixed therein. Hereinafter therefore reference is made to the first closure tool or the die, as being synonymous.

Interchangeability of the closure tool however basically entails the risk that, after a change in the clip, either it is forgotten that the compatible closure tool is used or by mistake a wrong closure tool is selected.

Because of differing material thickness different clips also involve different clip heights in the closed condition. It is therefore necessary for the rest position of at least one of the closure tools to be so adjusted that the closure spacing thereof is suited to the corresponding clip height. That is generally effected manually after each change in clip or each change in the interchangeable closure tool.

If suitable setting is not effected the consequence of that incorrect manipulation can be on the one hand that the set closure spacing is excessively great and the closure does not therefore attain the required level of strength. If on the other hand the set closure spacing is excessively small, the clip is closed too tightly around the tubular case and the tubular case can be damaged and/or an increased level of wear occurs at the moving parts of the clip machine and the closure tools and/or the clip machine is seriously damaged.

SUMMARY OF THE INVENTION

An object of the invention is to improve a clip machine and a method of operating a clip machine in such a way that the risk of improper manipulation is reduced and the operation of closing a clip around the packaging case is a more reliable procedure.

That object is attained by a system and a method of the kind set forth in the opening part of this specification, having the features of the characterising portions of claim 1 and claim 25 respectively. That object is further attained by a clip machine as set forth in claim 23 and a clip supply as set forth in claim 24.

If the clip machine has a first sensor device which is adapted to identify the fed clips on the basis of an identification which is associated with the clips and to output a corresponding clip information signal, a second sensor device which is adapted to identify the first closure tool on the basis of an identification associated therewith and to output a corresponding closure tool information signal, and a control means having a signal input coupled to the first and the second sensor devices and an evaluation means which is adapted to evaluate the clip information signal and the closure tool information signal and to output a compatibility signal, the above-indicated incorrect manipulation operations can be very substantially eliminated. For that purpose the compatibility signal must be made accessible to the operator of the machine and/or operation of the machine must be enabled or disabled in dependence on the compatibility signal.

In one embodiment of the invention, the clip supply has a reel body with a clip line wound thereon and a supply label with the identification of the supply of fed clips and in that case the first sensor device has a reading unit for the supply label.

In one embodiment, the supply label has an RFID (radio frequency identification) portion and the reading unit of the first sensor device has means for reading out such an RFID portion. An RFID label is very small and can therefore be applied virtually anywhere to the clip supply and preferably to the reel body. A further advantage is that the information is read out in a contact-free mode. The use of RFID labels is known for example from the logistics industry and is used there for tracking the circulation of goods. When used in accordance with the invention therefore the RFID label performs two functions at the same time, namely that of identifying the clip supply on the one hand and that of characterising goods for transport or storage on the other hand.

In one embodiment of the invention, the identification of the clip supply is afforded on the basis of an item of geometrical information of the clips fed by the clip supply themselves. In that case the first sensor device has a scanning system which is arranged along the feed and which is adapted to detect that item of geometrical information and to output an item of corresponding scanning information, and there is provided a comparison device which is coupled to the scanning system and which is adapted to receive the item of scanning information, compare it to a reference and output the result of the comparison to the evaluation device as a clip information signal.

The scanned geometrical information can be for example the size, contour, material thickness or the like of a clip line which is moved past the scanning system from the clip supply. In the case of the known supply winding or roll which is wound on a reel, comprising a metal line which is stamped to constitute a corrugated configuration (generally of aluminum wire), the clips are in the form of clips which are integrally interconnected at their limb ends. Depending on the respective clip size, the pitch division of the clip line ('wavelength' of the corrugation configuration) and/or the limb height of the clips ('amplitude') turn out to be of different magnitudes. Those differences can be detected by means of the scanning system according to the invention, for example in the form of a CCD (charge coupled device) camera, a light barrier arrangement, an acoustic signal transducer or other length or distance measuring device.

In accordance with an embodiment of the invention, the CCD camera detects the supplied clips optically, preferably from a direction which clearly reveals significant differences between various clips, and outputs an item of image information. The comparison device receives that image information and compares it to a reference image and in that way associates an item of clip size information with the detected image information.

In one embodiment, in the case of a scanning system with a light barrier arrangement it is so arranged that the generated light beam is interrupted by the clip line moving therepast in a regularity which is determined by the material thickness, the pitch division and the advance speed, for example whenever a limb of a clip is moved therepast. In that way the comparison device can either ascertain the width of the supplied clips with the assistance of an item of clock information as a reference, or the interruption pattern is directly compared to a reference pattern by the comparison device.

In one embodiment, the first closure tool has a tool label with the identification of the first closure tool and the second sensor device has a reading unit for the tool label.

The tool label can also have an RFID portion and the second sensor device can have suitable means for reading off the RFID label. In this case also the advantages of an RFID label lie in the ease with which it can be applied, afforded by the small size thereof, and the dual use.

In one embodiment, as an alternative to a tool label, the first closure tool (female die) can be identified on the basis of its geometrical nature (geometrical identification). In this advantageous embodiment the clip machine has a tool receiving means (female die receiving means) which as a second sensor device includes means for scanning the geometrical identification and for outputting a corresponding item of scanning information. That can be embodied in a contact mode by means of contact switches or the like. In a preferred development the scanning operation can also be effected in a contact-free fashion if the second sensor device has a comparison device which is coupled to the scanning means and which is adapted to compare the scanning information to a reference and to output the result of the comparison in the form of a closure tool information signal to the evaluation device. As in the case of the first sensor device, the actual specific configuration can be embodied in the form of a CCD camera, a light barrier arrangement, an acoustic signal transducer or other length or distance measuring device.

In another embodiment of the invention, the clip machine has a display device which is coupled to the control and which is adapted to output an optical and/or acoustic signal on the basis of the compatibility signal output by the control, if the first closure tool and the clip supply are not compatible. That permits the operator of the clip machine, after it has been fitted with a new clip supply or after a change in the closure tool, to recognise if he has made a mistake in operation and to eliminate the error before the clip machine is set in operation.

In an embodiment of the invention, the control of the clip machine is adapted on the basis of the compatibility signal to output a control signal which prevents the processing of the supplied clips if the first closure tool and the clip supply are not compatible and which enables processing of the supplied clips if the first closure tool and the supply of supplied clips are compatible. This higher-level safety device does not merely indicate to the operator when the situation involves incorrect manipulation, but in addition it preventatively prevents the machine from being set in operation if compatibility between the closure tool and the clip does not exist.

In the case of clip machines which have a setting means for setting the rest position of a closure tool and thus the closure spacing of the closure tools, the control in one embodiment is also adapted to determine and signal a reference rest position in dependence on the clip information signal and/or the closure tool information signal. Signalling includes the output of a signal indicating the corresponding situation for further use as well as direct acoustic or optical displays. At any event that permits simplified handling of the clip machine as the information about the automatically detected clip size and/or size of the closure tool which is in use can be used to indicate to the operator—for example after a closure tool change—that or also how the rest position is to be adjusted. For example pictograms (arrows and the like), numerical values, colors or sounds can be used to signal the direction in which the rest position of the closure tool is to be adjusted until the reference value is reached.

In another embodiment, the setting means further have an adjusting drive and a position determining device which is coupled to the control and which is adapted to ascertain the actual rest position of the closure tool, wherein the control is further adapted to output a control signal to the adjusting drive in dependence on the reference rest position and the actual rest position. That represents a higher degree of automation, in respect of which the operator no longer has to intervene manually after fitment of the closure tool, in order to move the closure tool into the reference rest position. That reduces the risk of incorrect manipulation procedures by a further level.

In another embodiment, the control has an interface for reading in product information and is adapted to verify coincidence between the clip information signal and/or the closure tool information signal on the one hand and the read-in product information on the other hand, and to output a plausibility signal on the basis of the verification result. In that way it is possible to indicate to the operator whether, for the product which he selected and which he inputs for example by way of a keyboard coupled to the control, the appropriate clip is being supplied and/or the suitable closure tool is fitted. That enhances once again the degree of process reliability.

In one embodiment of the method according to the invention of operating such a clip machine comprises the steps of identifying an identification of a fed clip, outputting a corresponding clip information signal, identifying an identification of at least one interchangeable first closure tool, outputting a corresponding closure tool information signal, evaluating the clip information signal and the closure tool information signal and outputting a compatibility signal.

BRIEF DESCRIPTION OF THE DRAWINGS

Further features and advantages of the clip machine according to the invention and the method according to the invention are set forth in the appendant claims. They are described in the description hereinafter of various embodiments by way of example with reference to the accompanying Figures in which:

DETAILED DESCRIPTION OF THE DRAWINGS

Figure 1:
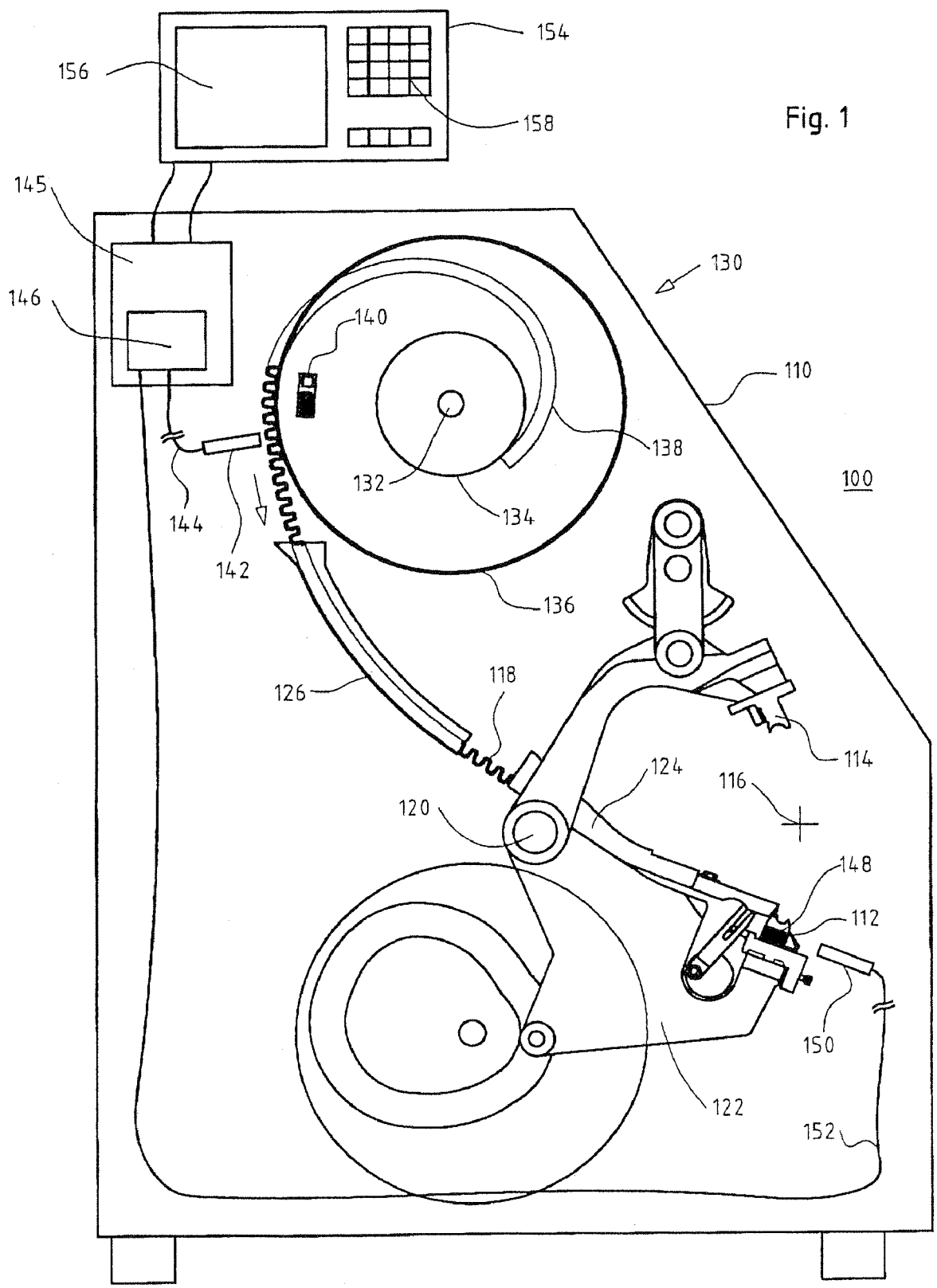
FIG. 1 is a diagrammatic view of a first embodiment of the system according to the invention with a clip machine and a clip supply.

The system 100 according to the invention is shown in FIG. 1 in a view reduced to its elements which are essential to the invention. In the interior of its housing the clip machine 110 according to the invention has two clip tools 112 and 114 which are movable relative to each other. They move towards a common center 116 which is typically defined by the axis of the tubular configuration of a filled packaging case which is to be closed. The closure element (clip) which is to be closed around a plaited end portion previously formed by constriction by displacement elements (not shown) of the clip machine 110 is fed to the first closure tool 112 in the form of a virtually 'endless' clip line 118 of a corrugated configuration. Therefore, for the purposes of feeding the clip line, the first closure tool 112 is fixed to a lever arm 122 (lower closure lever) which is mounted about a pivot axis 120 and which has a guide 124 which begins near the pivot axis 120. The guide 124 opens in the first closure tool 112 which in the illustrated case is an interchangeable female die.

The corresponding second closure tool 112 is a male die. The closure tools perform two functions when they move towards each other: firstly the foremost clip is severed from the following clip line 118 and thereafter it is shaped around the plaited end portion until the latter is fixedly closed.

A clip feed system 130 is arranged in the machine housing. It includes a mounting means 134, arranged on a shaft 132, for a clip supply according to the invention on a reel 136 which carries a supply winding or roll 138 of the clip line which is being processed in the clip machine 100. On the way from the reel 136 to the guide 124 on the lower closure lever 122 the clip line is further guided by a second guide 147 and is thus guided on a path defined over substantially the entire distance from the connecting element 140 to the closure tool 114.

The embodiment of the system according to the invention, as shown in FIG. 1, also has an identification for the clip supply, in the form of a supply label 140 mounted to the reel body 136. The supply label 140 includes on the one hand a portion with a contactlessly machine-readable optical bar code (or 2D code) and on the other an also contactlessly machine-readable transponder region (RFID portion) in which electromagnetically readable RF (radio frequency) information is stored. An item of information about the clip disposed on the reel can be encoded in each of the portions. In addition a printable region can also be provided on the label for human-readable information so that the clip size information can be input manually in the event of damage to the automatically readable label portions or in the event of failure of the reading unit.

The label can be accordingly read out by means of various sensor devices. For reading out in the proximity of the clip reel the clip machine has a first sensor device in the form of a reading unit 142 which is suitable for reading out the bar or 2D code and/or the RFID portion of the label 140 (the view in FIG. 1 is greatly simplified for illustration purposes and does not necessarily reflect the actual arrangement and orientation of the reading unit and the supply label). For that purpose the optical reading unit includes in known fashion a light source (laser), an optical lens system and a detector for receiving the reflected light. The means for reading out the RFID portion on the label 140 has in known manner a transmitting and receiving antenna and electronic system, with which the transponder of the label can be activated.

For reading out the supply label 140 which can be arranged at different positions depending on the respective angular position of the reel, it may be necessary for the reel firstly to be rotated into a reading position and/or to be moved past the reading unit 142 which is generally stationary. That can be effected automatically by means of a control program after the insertion of a fresh clip supply.

The identification which is read out in that way is fed by the reading unit 142 in the form of a clip information signal by way of a first signal line 144 to a control 145 and more precisely an evaluation means 146.

The interchangeable closure tool in the form of the female die 112 also has an identification in the form of a tool label 148. A second sensor device in the form of a reading unit 150 for optically reading off the tool label is arranged in the region of the initial or open position of the lower closure lever 122 or the first closure tool 112 as shown in FIG. 1 (at this point also the view in FIG. 1 is greatly simplified for illustration purposes and does not necessarily reflect the actual arrangement and orientation of the reading unit and the supply label). In contrast to the clip supply 136 the closure tool 112 is always in a defined position relative to the reading unit 150, more specifically in the case of a closure tool change typically in the illustrated starting position, which means that the operation of reading off the closure tool label 148 is simplified.

The tool label can also include for example a bar or 2D code portion and/or an RFID portion and/or a human-readable portion. A corresponding consideration also applies to the reading unit 150.

The clip information signal obtained by the reading unit 150 from the identification of the closure tool 112 in that way is fed to the evaluation means 146 by way of a second signal line 152. The evaluation means 146 evaluates the clip information signal and the closure tool information signal for example on the basis of a table comparison. If the comparison shows that the clip used and the closure tool 112 employed are compatible, the evaluation means 146, within the control 145, outputs a compatibility signal for further use.

The clip machine control 145 is connected to a display device in the form of a terminal 154. The terminal serves by means of a display screen 156 to output an optical indication signal, on the basis of the compatibility signal communicated by the control 145, if the first closure tool 112 and the clip supply are not compatible. It can also include a loudspeaker (not shown) which at the same time or alternatively produces an acoustic indication signal.

The terminal 154 also has an input keyboard 158 by way of which—for example under menu control—an item of product information relating to the sausage product or the like to be produced can be input, that information being passed to the control 145 by way of an interface. The control 145 or a computing unit included therein thereupon verifies a condition of coincidence between the clip information signal or the closure tool information signal and the product information. If a condition of coincidence obtains, the control 145 outputs a plausibility signal. That can in turn be input to the display which acknowledges that with an acknowledgement message or with call-up of a next input menu point. In addition it can be used as a start signal for the above-described comparison between the clip information and the closure tool information or, if that comparison has already been initiated, it can be used as a start signal for the clipping operation.

The terminal 154 and/or the control 145 can have further external interfaces for actuation of a filling device which is connected upstream of the clip machine 110 or a product removal device which is connected downstream of the clip machine 110.

Figure 2:
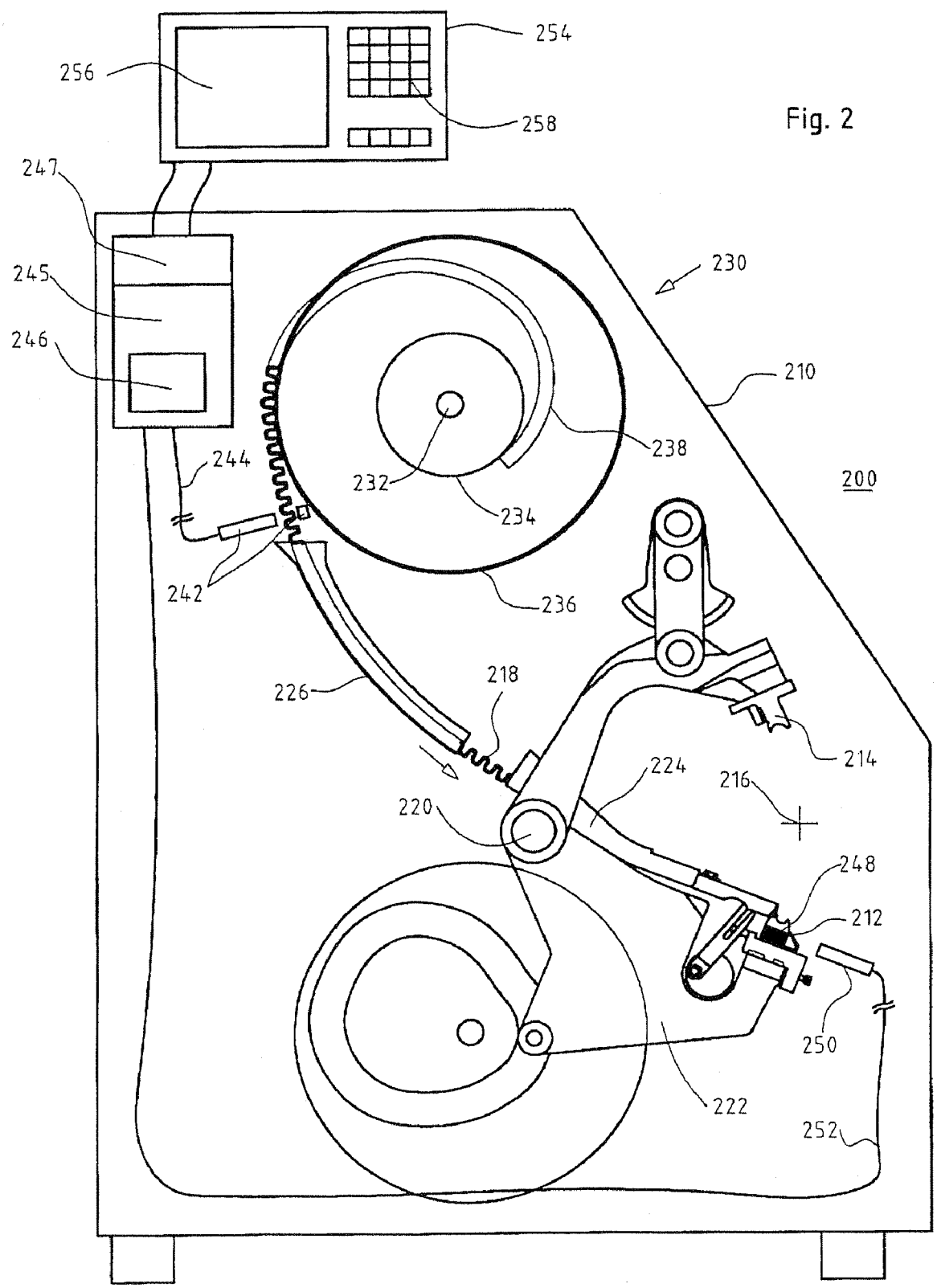
FIG. 2 shows a diagrammatic view of a second embodiment of the system according to the invention.

FIG. 2 shows a further embodiment of the system 200 according to the invention, with a clip machine 210 which is the same as the clip machine of FIG. 1 except for some features which are essential to the invention.

As a departure from the embodiment of FIG. 1, in FIG. 2 the sensor unit has a scanning system in the form of a light barrier arrangement 242 along the feed path of the clip line 218 (FIG. 2 also shows the reading unit and the supply label in only highly diagrammatic form for illustration purposes and does not necessarily reflect the actual arrangement and orientation thereof). The clip line 218 passes through the light barrier arrangement 242 and in so doing triggers for example a periodic on/off signal when the limbs of the clips pass the light barrier arrangement. The on/off signal is fed by way of a signal line 252 to a comparison device 247 associated with the sensor unit. With a known or monitored clip advance speed, the pitch division of the clip line can be ascertained from the on/off signal by means of an additional time or clock information and thus geometrical information about the clips 218 fed from the clip supply can be obtained. For that purpose the comparison device 247 also has an input for a clock signal and an input for an advance speed signal (these two are not shown). By comparing the clip pitch division ascertained in that way to a reference, the comparison device 247 ascertains the clip information and passes that in the form of a clip information signal to the evaluation means 246 which—in the same manner as described hereinbefore—determines the compatibility of the supplied clips 218 and the first closure tool 212 used, from the input clip information signal and the closure tool information signal.

Figure 3:
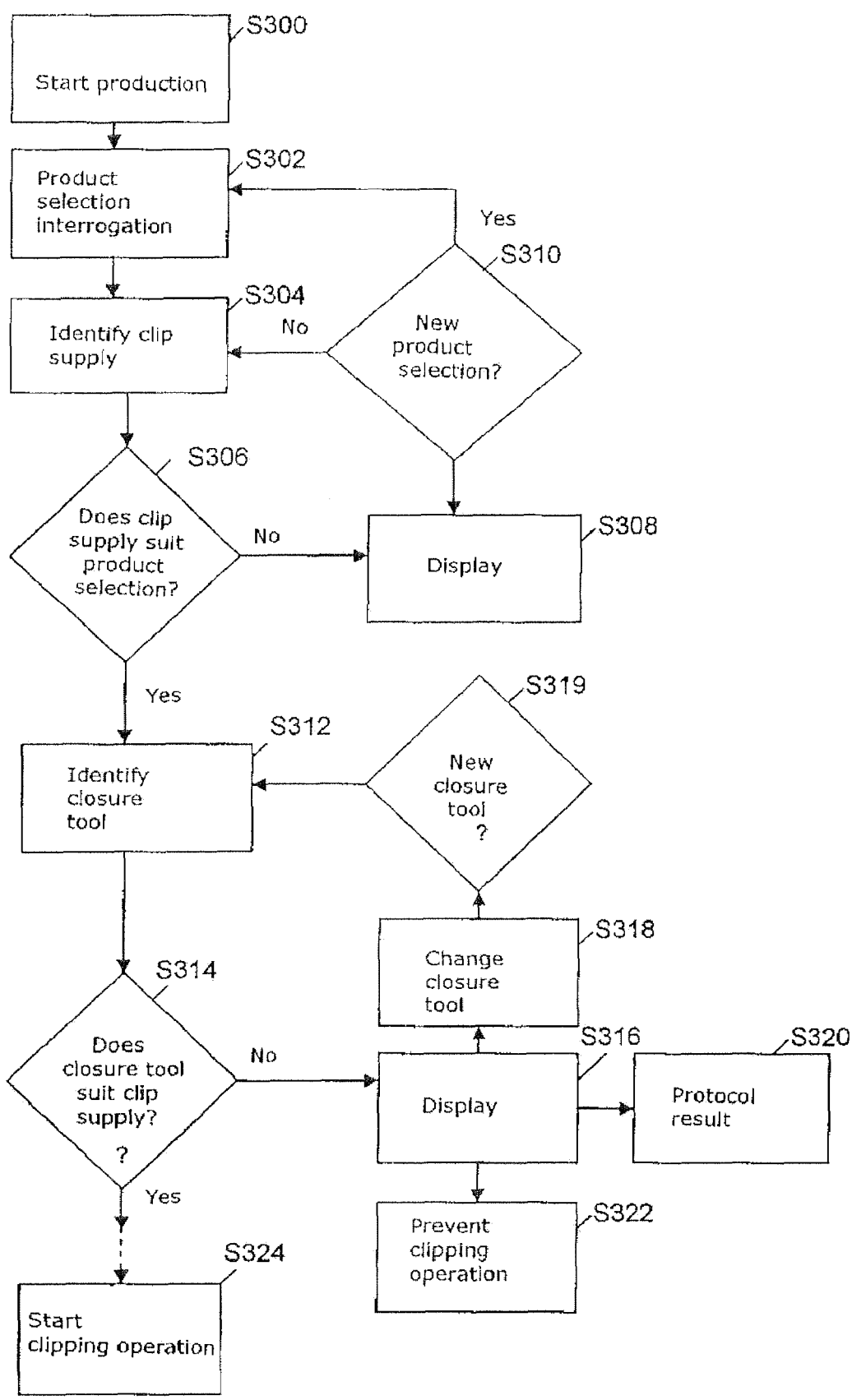
FIG. 3 shows a flow chart of the method according to the invention of operating a clip machine.

Reference is now made to FIG. 3 to describe an embodiment of the method according to the invention of operating a clip machine.

Initialisation of the clip machine begins with each product start S 300. Such initialisation can include the steps described hereinafter but also for example a set-up method in which the rest position of the closure tools can be determined and possibly adjusted. In a step S 302 the desired product selection is interrogated. That can take place for example under menu control by way of the above-described terminal 154 or by way of an external bus, by way of which the clip machine 110, 112 or the control 145, 245 thereof is connected for example to an external control/computing unit or machine. When the product selection is interrogated by way of the terminal 154, the operator can input his selection by way of the keyboard 254 or a touch-sensitive screen and confirm it.

In a step S 304, the clip supply which is fitted into the clip machine is identified, as the next item of information. When that has been done, then in step S 306 a plausibility check is implemented, in which a check is made to ascertain whether the identified clip supply suits the interrogated product selection. If that is not the case then the compatibility signal is displayed for example at the terminal 154 in step S 308. At the same time in step S 310 a query is triggered, which presents the operator of the machine with the choice of making a fresh product selection or fitting a new clip supply. If he decides for a new clip supply, the loop leads back to step 304 and the clip supply is identified afresh, after the operator has confirmed the change in the clip supply or has denied the fresh product selection. If in contrast the original product selection were wrong and if the operator therefore decides to make a fresh product selection, product selection interrogation S 302 again follows a corresponding confirmation.

If finally the plausibility check in step S 306 shows that the identified clip supply is appropriate for the product selection made, then in a next step S 312 the fitted closure tool is identified by means of the above-described second sensor device. The result, namely the closure tool information signal, is transferred to the control which in step S 314 implements a compatibility check, that is to say for example by means of a table comparison it checks whether the identified closure tool suits the identified clip supply. If that is not the case then the result is displayed again in step S 316. That can be followed in step S 316 by a closure tool change operation and after the closure tool change operation in step S 319 an interrogation operation can again be effected by way of the terminal, in response to which the operator confirms the closure tool change operation implemented. The closure tool is thereupon identified afresh in step S 312.

In addition the incompatibility event is protocolled in step S 320. Events protocolled in that way can be read out for example upon a service and it is thus possible to draw conclusions about possible incorrect manipulation procedures or other error sources.

In a further step S 322, upon incompatibility, the clipping operation, that is to say processing of the supplied clips, is prevented by the output of a corresponding blocking signal by the control until the change of the closure tool has been effected in step S 318 and confirmed in step S 319, a new closure tool identification operation S 312 has taken place and verification in S 314 has shown that compatibility is now given.

Further interrogation steps can be effected between establishing compatibility in step S 314 and the definitive start of the clipping operation in step S 324. For example the actual rest position of one or both closure tools 112, 114 and 212, 214 respectively and thus the closure spacing can be ascertained by means of a position determining device provided for that purpose. That actual rest position is then for example compared either directly to the clip information signal and/or the closure tool information signal or to a reference rest position determined from one or both signals. The reference rest position can in turn be effected once again in the clip machine control after identification of the clip supply and/or identification of the closure tool, and put into intermediate storage.

Both the actual rest position and also the reference rest position are thereafter displayed for example on a terminal 154 in order to signal to the operator, as a setup aid, the direction in which he has to displace the rest position of the closure tool by way of the setting means so that the reference rest position is reached. If the setting means of the clip machine has an adjusting drive so that the rest position can be automatically adjusted, the result of the comparison of the actual rest position with the reference rest position serves as a control signal for the adjusting drive.

Further initialisation steps can also be envisaged before the clipping operation is started in S 324.

Besides the above-described first and second sensor devices for identifying the identification of the clip supply and the closure tool it is also possible to envisage further reading units or scanning systems which, acting in the same way, ascertain geometrical information or information encoded in another fashion but with other physical means. For example both for identifying the identification of the clip supply and also the closure tool, it is possible to use CCD cameras, scanners, spacing sensors, light barrier arrangements, or acoustic signal converters which produce a sound signal and detect an echo signal which is significant for the geometrical structure or the like.

In the illustrated embodiments the interchangeable closure tool is the female die. The invention however is not restricted to that embodiment of the system or the clip machine. Nonetheless in accordance with the invention at the same time or instead of the female die the second closure tool, namely the male die, can (also) be designed to be interchangeable so that it can (also) be adapted to the size of the clip to be shaped. Sensor detection in accordance with the invention of the male die used can be correspondingly implemented if it has an identification and if there is associated therewith a sensor device which is adapted in the same way to identify the identification and to output a closure tool signal to the control of the clip machine which evaluates same in a suitable fashion and outputs the compatibility signal in dependence (also) on the third closure tool information signal.

The clip supply does not have to be formed by a reel with a winding of the above-described kind. It will be appreciated that the invention can also be used in relation to any kind of feed for the clip supply.

As—whatever its nature—the clip supply usually in any case carries an article identification, that can already permit adequate identification of the clip supply also for use in accordance with the invention in the clip machine if fitment of the label ensures machine readability.

The method according to the invention of operating a clip machine is not restricted to the embodiment set forth in relation to FIG. 3 either in respect of the sequence or the number and nature of the method steps.

The invention claimed is:

1. A method of operating a clip machine for closing clips around a packaging case comprising the steps:
providing a clip machine having at least one interchangeable first closure tool for closing clips around a packaging case;
providing a clip supply;
identifying an identification of the clip supply,
outputting a corresponding clip information signal;
identifying an identification at least of the interchangeable first closure tool;
outputting a corresponding closure tool information signal;
evaluating the clip information signal and the closure tool information signal; and
outputting a compatibility signal.

2. The method of claim 1, wherein the step of identifying the identification of the clip supply includes reading a supply label associated with the clip supply.

3. The method of claim 2, wherein the supply label is read optically.

4. The method of claim 2, wherein the supply label is an RFID label and is read electronically.

5. The method of claim 1, wherein the step of identifying the identification of the clip supply comprises a step of scanning an item of geometrical information of clips fed from the clip supply and comparing the scanning information obtained in that way to a reference and outputting the result of the comparison as the clip information signal.

6. The method of claim 5, wherein the step of scanning comprises optically detecting an item of image information and comparing the image information to a reference image.

7. The method of claim 5, wherein the step of identifying the identification of the first closure tool comprises reading a tool label associated with the first closure tool.

8. The method of claim 7, wherein the tool label is read optically.

9. The method of claim 7, wherein the tool label comprises an RFID portion and is read electronically.

10. The method of claim 1, wherein the step of identifying the identification of the first closure tool comprises a step of scanning a geometrical identification of the first closure tool.

11. The method of claim 10, further comprising comparing the geometrical identification of the first closure tool to a reference and outputting the result of the comparison as the closure tool information signal.

12. The method of claim 1, further comprising the step of acoustically and/or visually displaying the compatibility of the first closure tool and the clip supply on the basis of the output compatibility signal.

13. The method of claim 1, further comprising the steps of:
preventing the processing of fed clips if the first closure tool and the clip supply are not compatible; and
enabling the processing of the fed clips if the first closure tool and the clip supply are compatible.

14. The method of claim 1, wherein a rest position of a closure tool is adjustable, and further comprising determining a reference rest position and outputting a signal in dependence on the clip information signal and/or the closure tool information signal.

15. The method of claim 14, wherein the rest position of the closure tool is set in dependence on the reference rest position.

16. The method of claim 1 further comprising the steps of:
reading in an item of product information;
verifying a condition of coincidence between the clip information signal and/or the closure tool information signal and the product information; and
outputting a validity signal on the basis of the verification result.

17. A clip machine comprising:
at least one interchangeable first closure tool which to close clips around a packaging case is movable relative to a second closure tool, wherein the first closure tool has a predetermined identification;
a first sensor device to identify the identification of a clip supply and output a corresponding clip information signal, a second sensor device to identify the identification of the first closure tool and output a corresponding closure tool information signal, and a control having a signal input coupled to the first and the second sensor devices and an evaluation means to evaluate the clip information signal and the closure tool information signal and to output a compatibility signal.

18. A system comprising:
a clip machine having at least one interchangeable first closure tool which to close clips around a packaging case and is movable relative to a second closure tool; and
a clip supply;
wherein the first closure tool and the clip supply each have a respective identification and the clip machine has a first sensor device to identify the identification of the clip supply and output a corresponding clip information signal, a second sensor device to identify the identification of the first closure tool and output a corresponding closure tool information signal, and a control having a signal input coupled to the first and the second sensor devices and an evaluation means to evaluate the clip information signal and the closure tool information signal and to output a compatibility signal.

19. The system of claim 18, wherein the clip supply comprises a reel body with a line of clips wound thereon and a supply label with the identification of the clip supply and the first sensor device comprises a reading unit for the supply label.

20. The system of claim 19, wherein the supply label is applied to the reel body.

21. The system of claim 19, wherein the supply label comprises an optically readable portion and the reading unit of the first sensor device comprises an optical reading unit.

22. The system of claim 19, wherein the supply label comprises an RFID portion and the reading unit of the first sensor device comprises means for reading an RFID label.

23. The system of claim 18, wherein the first sensor device comprises a scanning system to detect the identification of the clip supply in the form of an item of geometrical information of clips fed from the clip supply and to output a corresponding item of scanning information and further comprising a comparison device coupled to the scanning system and configured to receive the scanning information, to compare it to a reference and to output the result of the comparison as the clip information signal to the evaluation means.

24. The system of claim 23, wherein the scanning system comprises a CCD camera to optically detect the fed clips and to output an item of image information as scanning information and the comparison device compares the image information to a reference image.

25. The system of claim 23, wherein the scanning system comprises a light barrier arrangement.

26. The system of claim 23, wherein the scanning system comprises an acoustic signal generator and an acoustic signal receiver.

27. The system of claim 23, wherein the scanning system comprises a length measuring device.

28. The system of claim 18, wherein the first closure tool comprises a tool label with the identification of the first closure tool and the second sensor device comprises a reading unit for the tool label.

29. The system of claim 28, wherein the tool label comprises an optically readable portion and the reading unit of the second sensor device comprises an optical reading unit.

30. The system of claim 28, wherein the tool label comprises an RFID portion and the reading unit of the second sensor device comprises means for reading an RFID label.

31. The system of claim 18, wherein the first closure tool comprises a female die with a geometrical identification and the clip machine comprises a female die mounting means, wherein the second sensor device includes means for scanning the geometrical identification and for outputting a corresponding item of scanning information.

32. The system of claim 31, wherein the second sensor device comprises a comparison device coupled to the means for scanning and which is configured to receive the scanning information, to compare it to a reference and to output the result of the comparison as the closure tool information signal to the evaluation means.

33. The system of claim 31, wherein the means for scanning comprises a light barrier arrangement.

34. The system of claim 18, wherein the clip machine further comprises a display device coupled to the control and which on the basis of the compatibility signal outputs an optical and/or acoustic indication signal if the first closure tool and the clip supply are not compatible.

35. The system of claim 18, wherein the control on the basis of the compatibility signal outputs a control signal which prevents processing of fed clips if the first closure tool and the clip supply are not compatible and enables same if the first closure tool and the clip supply are compatible.

36. The system of claim 18, wherein the clip machine further comprises a setting means for setting a rest position of the closure tool and thus a spacing of the closure tools in the closure position thereof, and the control determines a reference rest position in dependence on the clip information signal and/or the closure tool information signal.

37. The system of claim 36, wherein the setting means comprises an adjusting drive and a position determining device coupled to the control and ascertains an actual rest position of the closure tool, wherein the control output a control signal to the adjusting drive in dependence on the reference rest position and the actual rest position of the closure tool.

38. The system of claim 18, wherein the control comprises an interface for reading in an item of product information and for verifying coincidence between the clip information signal and/or the closure tool information signal and the product information and to output a validity signal on the basis of the verification result.

* * * * *